3,790,632
BICYCLOHEPTENE-7-SYN-CARBALDEHYDES
Graham Ernest Robinson, Macclesfield, England, assignor to Imperial Chemical Industries Limited, London, England
No Drawing. Filed Mar. 28, 1972, Ser. No. 238,968
Claims priority, application Great Britain, Dec. 16, 1971, 58,400/71
Int. Cl. C07c 103/19
U.S. Cl. 260—557 B          5 Claims

ABSTRACT OF THE DISCLOSURE

The disclosure relates to novel bicycloheptene-7-syn-carbaldehydes, and to a novel process for the manufacture of both known and the novel bicycloheptene-7-syn-carbaldehydes, by isomerization of the corresponding anti-carbaldehydes in the presence of an amine.

This invention relates to novel bicycloheptene derivatives and a novel process for their manufacture, which bicycloheptene derivatives are valuable intermediates for the manufacture of prostaglandins and prostaglandin-like compounds.

In a known synthesis of prostaglandins and prostaglandin-like compounds the initial stages of the synthetic sequence comprise:

(a) the addition of thallium cyclopentadienide to chloromethyl benzyl ether to give 5-benzyloxymethyl-1,3-cyclopentadiene I, which is
(b) subjected to the Diels-Alder reaction with 2-chloroacryloyl chloride.
(c) The bicyclic acid chloride II thus produced is converted to the corresponding acyl azide, which on heating undergoes Curtius rearrangement to the isocyanate. The isocyanate is hydrolyzed to the bicyclic ketone III, which is
(d) subjected to Baeyer-Villiger oxidation to a bicyclic lacetone IV.
(e) The lactone is saponified and iodinated to give a rearranged iodo-lactone V, which is
(f) acylated with p-phenylbenzoylchloride and the prodduced acyloxy lactone VI is
(g) de-iodinated to give the benzyloxymethyl lactone VII.
(h) The benzyloxymethyl lactone VII is hydrogenolyzed to the hydroxymethyl lactone VIII, which is
(i) oxidized to the aldehyde lactone IX, which is converted to a prostaglandin or a prostaglandin-like compound in conventional manner.

This known reaction sequence is unsuited to the large-scale manufacture of prostaglandins or prostaglandin-like compounds for several reasons, of which the more important are:

(1) the need to recover and recycle the thallium, together with its toxicity, make the use of thallium undesirable on a large scale;
(2) the low temperature of —22° C. at which the thallium cyclopentadienide is alkylated with chloromethyl benzyl ether is inconvenient, and uneconomic for large scale manufacture;
(3) the presence of the carcinogenic bis(chloromethyl) ether as an impurity in chloromethyl benzyl ether makes this compound unsuitable for use in large scale manufacture; and
(4) the reductive debenzylation of the lactone VII requires the use of a palladium catalyst and a pressure of hydrogen of 45 p.s.i., both of which are undesirable for use on a large scale.

In a modification of the earlier stages of this process which avoids these disadvantages, acetoxyfulvene is reacted in a Diels-Alder reaction with, for example, 2-chloroacrylonitrile to give the bicyclo[2,2,1]heptene derivative X which is hydrolyzed to give the anti-aldehyde[1] XI, the anti-aldehyde is isomerized by acid to the syn-aldehyde.[1]

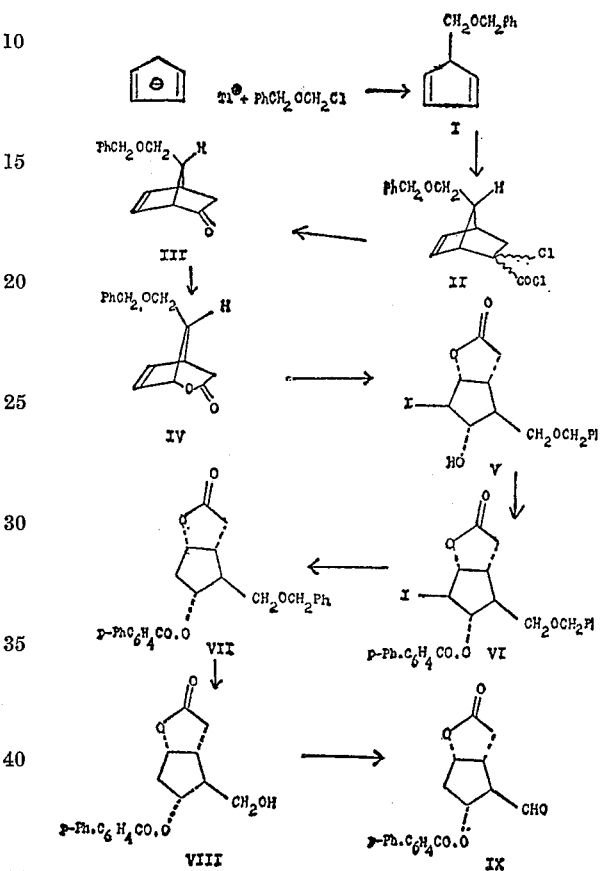

XII. The syn-aldehyde XII is reacted with trimethyl ortho-formate to give the dimethyl acetal, which on reaction with 1,2-xylen-α,α'-diol yields the corresponding 1,2-xylen-α,α'-diyl acetal XIII. The acetal XIII is hydrolyzed with potassium hydroxide in dimethylsulphoxide to the ketone XIV which is subjected to Baeyer-Villiger oxidation with m-chloroperbenzoic acid to the lactone XV.

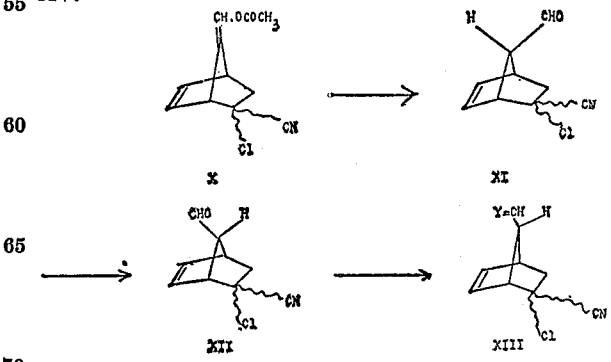

[1] Anti—refers to a substituent lying on the opposite side of the bridgehead to the double bond ; syn—refers to a substituent on the same side of the bridgehead.

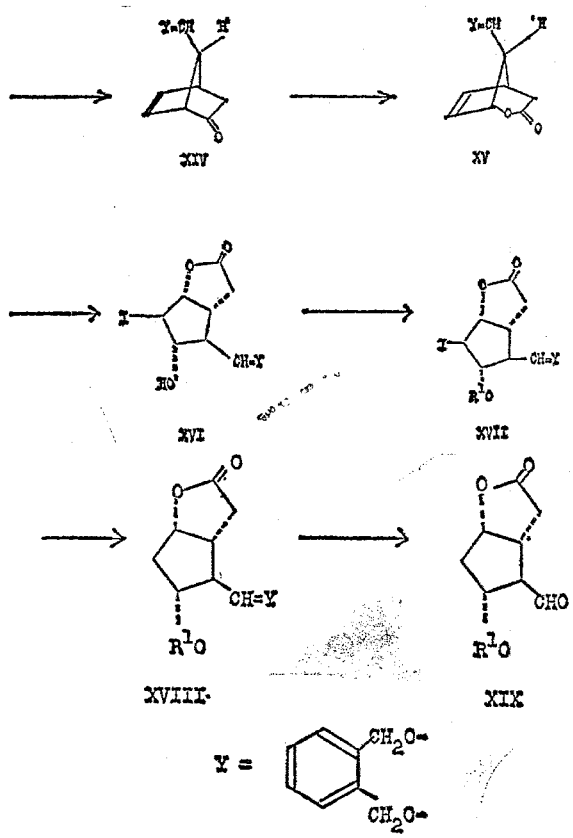

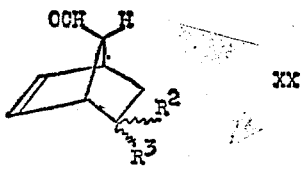

Lactone XV is saponified with sodium hydroxide, neutralized with acetic acid and the product treated with potassium tri-iodide to give an iodohydrin XVI, which is reacted with p-phenylbenzoyl chloride to give the ester XVII. The ester XVII is treated with tributyl tin hydride to give the de-iodinated lactone XVIII, hydrogenolysis of which removes the acetal grouping to give the previously known aldehyde XIX ($R^1$=p-phenylbenzoyl, i.e. IX), which is then converted to a prostaglandin or a prostaglandin-like compound in the same way as it is known to convert the known aldehyde XIX ($R^1$=acetyl) to prostaglandin $F_2\alpha$.

Heretofore, the isomerization of the anti-aldehyde XI to the syn-aldehyde XII could only be achieved by treatment with acid, and it is a disadvantage of this process that the isomerization conditions are critical. Dilute acid and prolonged reaction times are required in order to avoid decomposition of the aldehyde XII after its formation, and only partial isomerization to the required aldehyde XII is normally achieved.

The present invention relates to novel bicycloheptene-7-syn-carbaldehydes, and to a novel isomeriztaion process for the preparation of either the novel bicycloheptene-7-syn-carbaldehyde of the invention or the previously known bicycloheptene-7-syn-carbaldehydes, such as XII, at ambient temperature in high yield, without requiring prolonged reaction times, and without substantial decomposition of the syn-aldehyde formed.

Thus, according to the invention there is provided a bicycloheptene-7-syn-carbaldehyde of the formula:

wherein $R^2$ is a halogen atom and $R^3$ is the carbamoyl radical, an alkoxycarbonyl radical of up to 6 carbon atoms or an N-alkylcarbamoyl radical wherein the alkyl radical contains from 1 to 6 carbon atoms.

It is to be understood that the wavy lines in the above formula indicate that either of $R^2$ and $R^3$ is in the exo configuration and the other is in the endo configuration, that is, the formula represents a mixture of compounds isomeric at carbon atom 5. It is also to be understood that the above and subsequent formulae herein represent racemates, which may, however, be resolved to lead to a prostaglandin of the natural series.

A suitable value for $R^2$ when it is a halogen atom is, for example, the chlorine or bromine atom. A suitable value for $R^3$ when it is an alkoxycarbonyl radical is, for example, the methoxycarbonyl radical, and a suitable value when it is an N-alkylcarbamoyl radical is, for example, the N-methylcarbamoyl radical.

Preferred bicycloheptene-7-syn-carbaldehydes of the invention are those wherein $R^2$ is chlorine or bromine, and $R^3$ is the carbamoyl or methoxycarbonyl radical, particularly 5 - chloro-7-syn-formylbicyclo[2,2,1]hept-2-ene-carboxamide and methyl 5-chloro-7-syn-formylbicyclo[2,2,1]-hept-2-ene-5-carboxylate.

According to a further feature of the invention there is provided a novel process for the manufacture of a bicycloheptene - 7-syn-carbaldehyde of the Formula XX wherein $R^2$ is a halogen atom and $R^3$ is a radical of the formula $R^4$ wherein $R^4$ is the cyano or carbamoyl radical, an alkoxycarbonyl radical of up to 6 carbon atoms or an N-alkylcarbamoyl radical wherein the alkyl radical contains from 1 to 6 carbon atoms which comprises reacting a bicycloheptene-7-anticarbaldehyde of the formula:

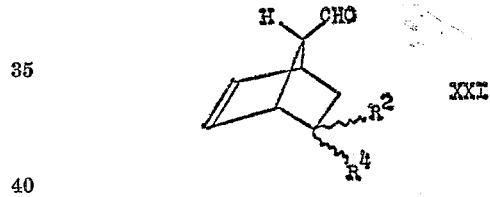

wherein $R^2$ and $R^4$ have the meanings stated immediately above, in a solvent with an amine of the formula $R^5R^6NH$, wherein $R^5$ and $R^6$ are each an alkyl, aralkyl or aryl radical of up to 15 carbon atoms, preferably of up to 8 carbon atoms.

It is to be understood that the invention includes the process wherein the reaction of the aldehyde with an amine affords an aldehyde-amine adduct, for example a Schiff base, which may be isolated and used as such in the isomerization reaction, as well as the process wherein an aldehyde-amine adduct is formed in situ and is not isolated.

Suitable amines $R^5R^6NH$ are, for example, aromatic primary and secondary amines, for example aniline, p-chloroaniline, p-toluidine and N-methylaniline.

A suitable solvent is, for example, an alkanol, for example methanol, ethanol, isopropanol or t-butanol, or a chlorinated aliphatic hydrocarbon, for example methylene dichloride, and it is advantageous to adjust the pH of the reaction mixture to less than 6, preferably between 4 and 5, by the addition of an acid, for example an alkanoic acid, for example glacial acetic acid.

The amine $R^5R^6NH$ may be present in the reaction to the extent of between 0.1 and 5.0 equivalents per one equivalent of the aldehyde of the Formula XXI, but is preferably present to the extent of 0.5–2.0 equivalents per equivalent of the aldehyde.

The reaction should be continued until isomerization is substantially complete, as evidenced by the appearance in the NMR spectrum of the reaction product of a doublet signal between δ9.50 and 9.60 due to the aldehyde proton of the aldehyde XX having the required syn-stereochemistry at C-7. A typical reaction time is 16 to 21 hours.

The aldehyde of the Formula XXI used as the starting material in the above process may be obtained as described above by reaction of a fulvene derivative of the formula:

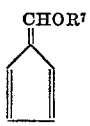

XXII wherein $R^2$ and $R^3$ have the meanings stated above and $R^7$ is an alkyl, alkanoyl, alkanesulphonyl or arenesulphonyl radical, each of up to 7 carbon atoms, for example the t-butyl, acetyl, methanesulphonyl or toluene-p-sulphonyl radical, with an olefin of the formula $CH_2{:}CR^2R^4$, wherein $R^2$ and $R^4$ have the meanings stated above, followed by hydrolysis of the group $CHOR^7$ to 7-intiformyl, or for those aldehydes of the Formula XXI wherein $R^4$ is a carbamoyl of N-alkylcarbamoyl radical, the reaction of the compound of the formula:

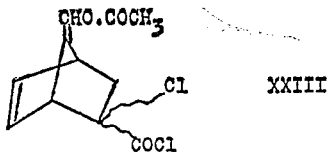

XXIII prepared as described above, with ammonia or an alkylamine of 1 to 6 carbon atoms.

The aldehyde of the Formula XX may be converted to a prostaglandin or a prostaglandin-like compound in the same way as it is known to so convert the aldehyde of the Formula XII.

The invention is illustrated but not limited by the following examples:

EXAMPLE 1

5-chloro - 5 - cyanobicyclo[2,2,1]hept-2-ene - 7 - anti-[2] carboxaldehyde (116.7 g.) and p-chloroaniline (98.2 g.) were dissolved in glacial acetic acid (116 ml.) and isopropanol (950 ml.), and the solution was stirred under an atmosphere of nitrogen for 20 hours at room temperature. The solvents were evaporated, 2 N-hydrochloric acid (500 ml.) was added to the residue, and the mixture was extracted twice (400 ml. and 200 ml.) with methylene dichloride. The combined extracts were washed successively with 2 N hydrochloric acid (250 ml.), aqueous sodium bicarbonate solution until acid free, and water (2× 30 ml.), and were dried over magnesium sulphate. The solvent was evaporated to give a viscous oil consisting of >90% of 5-chloro-5-cyanobicyclo[2,2,1]hept - 2-ene-7-syn-carboxaldehyde, which may be used without further purification.

EXAMPLE 2

Using the process described in Example 1 but replacing the p-chloroaniline by 0.5 equivalent of p-toluidine and reacting for 18 hours, there was similarly obtained 90% isomerization to the syn-aldehyde.

EXAMPLE 3

The process described in Example 1 was repeated, save that the glacial acetic acid was omitted, and using the amines and solvents shown, to obtain the following results:

2.0 equivalents of N-methylaniline in methanol for 18 hours gave 40% isomerization;
2.0 equivalents of N-methylaniline in ethanol for 18 hours gave 65% isomerization;
1.2 equivalents of aniline in isopropanol for 16 hours gave 75% isomerization;
2.0 equivalents of aniline in methanol for 16 hours gave 88% isomerization;
2.0 equivalents of aniline in t-butanol for 20 hours gave >90% isomerization.

[2] A 7-anti substituent lies on the opposite side of the C-7 bridge to the double bond, a 7-syn substituent lies on the same side.

EXAMPLE 4

A 5% solution of 5-chloro-7-anti-formylbicyclo-[2,2,1] hept-2-ene-5-carboxamide (XXI, $R^2$=chlorine, $R^3$=carbamoyl) in methylene dichloride containing 1.5 equivalents of p-chloroaniline was stirred overnight, washed twice with 3 N hydrochloric acid and filtered, and the solvent was evaporated. The residue was dissolved in ethyl acetate and the solution was percolated through a pad of kieselgel to remove low $R_F$ impurities. Evaporation of the solvent gave 5-chloro-7-syn-formylbicyclo[2,2,1]hept - 2-ene-5-carboxamide (XX, $R^2$=chlorine, $R^3$=carbamoyl). The NMR spectrum in deuteriochloroform showed a doublet at $\delta$=9.6 (J=2 Hz.) characteristic of the 7-syn-formyl group.

The 5-chloro-7-anti-formylbicyclo[2,2,1]hept - 2 - ene-5-carboxamide used as starting material in the above process may be obtained as follows:

7-acetoxymethylene-5-chlorobicyclo[2,2,1]hept - 2-ene-5-carbonyl chloride was added to an excess of methanol saturated with ammonia. After ½ hr. the resulting solution was made acid with 3 N hydrochloric acid, and extracted with methylene dichloride. The extract was evaporated to dryness, the residue was dissolved in a small volume of methylene dichloride, and the solution was stirred vigorously with 3 N hydrochloric acid for 2 hours. The organic phase was separated, filtered and evaporated to dryness, to give crude 5-chloro - 7 - anti-formylbicyclo[2,2,1]hept - 2-ene-5-carboxamide, $R_F$=0.52 (ethyl acetate/silica gel). The NMR spectrum in deuteriochloroform showed a singlet at $\delta$=9.7, characteristic of the 7-anti-formyl group.

EXAMPLE 5

The process described in Example 4 was repeated using methyl 5 - chloro-7-anti-formylbicyclo[2,2,1]hept-2-en-5-carboxylate (XXI, $R^2$=chlorine, $R^4$=methoxycarbonyl) in place of 5-chloro - 7 - anti-formylbicyclo[2,2,1]hept-2-ene-5-carboxamide, to give methyl 5-chloro-7-syn-formyl-bicyclo[2,2,1]hept-2-ene - 5 - carboxylate (XX, $R^2$=chlorine, $R^3$=methoxycarbonyl), $\nu$ max.=1745 cm.$^{-1}$ (film-methyl ester). The NMR spectrum is deuteriochloroform showed a characteristic band as a 3H singlet at $\delta$=3.73, due to the ester methyl group.

The methyl 5-chloro-7-anti-formylbicyclo[2,2,1]hept-2-ene-5-carboxylate used as starting materials may be prepared by the process described in the latter part of Example 4, using methyl 7-acetoxymethylene-5-chlorobicyclo[2,2,1]hept-2-ene-5-carboxylate in place of 7-acetoxymethylene-5-chlorobicyclo[2,2,1]hept-2-ene - 5 - carbonyl chloride.

EXAMPLE 6

2-chloroacryloyl chloride (2.75 g.) was added to a solution of α-acetoxyfulvene (2.72 g.) in cyclohexane (10 ml.), and the mixture was stirred at ambient temperature for 4 hours. The reaction mixture was filtered, and the solvent was evaporated to give 7-acetoxymethylene-5-chlorobicyclo[2,2,1]hept - 2 - ene - 5 - carbonyl chloride, which was used in the process described in the second part of Example 4 without further purification. The NMR spectrum in deuteriochloroform showed the following characteristic features ($\delta$ values):

2.07 and 2.10, 3H, singlet, methyl (2 isomers at C–5)
6.1–6.7, 2H, multiplet, ring olefinic protons
6.67 1H, singlet, acetoxymethylene olefinic proton.

In a similar manner, but using methyl 2-chloroacrylate in place of 2-chloroacryloyl chloride, there was obtained methyl 7-acetoxymethylene-5-chlorobicyclo[2,2,1]hept-2-ene-5-carboxylate. The NMR spectrum in carbon tetrachloride showed similar characteristic bands to those in the spectrum of the above-described acid chloride, with the addition of a 3H singlet at $\delta$=3.69 and 3.72 due to the ester methyl group (isomers at C–5).

EXAMPLE 7

5-chloro-7-syn-formylbicyclo[2,2,1]hept-2-ene - 5 - carboxamide (XX, R³=chlorine, R³=carbamoyl) (15 g., 0.08 mole), trimethyl orthoformate (26 g., 0.25 mole) and toluene-p-sulphonic acid (710 mg., 4 mmoles) were dissolved in methanol (500 ml.), and the solution was heated under reflux for 20 hours. The solvents were evaporated under reduced pressure and the residual oil was dried under high vacuum using an oil pump, to give a mixture of epimeric dimethyl acetals. The NMR spectrum is deuteriochloroform showed characteristic bands at:

3.20–3.38, 6H, 2 methoxy
4.88, 1H, $(CH_3O)_2C\underline{H}$—CH< (J=9 Hz.).

The dimethyl acetal (22.7 g.) was dissolved in ethanol (225 ml.) containing dimethylsulphoxide (25 ml., dried over 4A molecular sieves) sodium hydroxide (8.4 g.) was added, and the solution was heated under reflux in an inert atmosphere for 20 hours. The solution was cooled, diluted with water (250 ml.) and extracted with methylene dichloride (4× 125 ml.). The combined extracts were washed with water (4× 125 ml.) and dried, and the solvent was evaporated under reduced pressure to give an oil, which crystallized from pentane give 7-syn-dimethoxymethylbicyclo[2,2,1]hept-2-en-5-one, M.P. 45° C.

Methyl 5-chloro-7-syn-formylbicyclo[2,2,1]hept-2-ene-5-carboxylate was converted to 7-syn-dimethoxymethylbicyclo[2,2,1]hept-2-en-5-one in a similar manner.

7-syn-dimethoxymethylbicyclo[2,2,1]hept-2-en-5-one is converted to a prostaglandin or a prostaglandin-like compound in the same way as it is known so to convert 7-syn-(1,2-xylen-α,α'-dioxymethyl)bicyclo[2,2,1]hept - 2 - en-5-one, XIV.

What I claim is:
1. A bicycloheptene - 7 - syn-carbaldehyde of the formula:

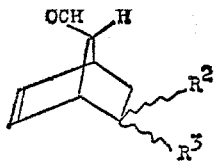

wherein R² is halogen and R³ is carbamoyl, alkoxycarbonyl of up to 6 carbon atoms or N-alkylcarbamoyl wherein the alkyl contains 1 to 6 carbon atoms.

2. A bicycloheptene - 7 - syn-carbaldehyde of claim 1 wherein R² is chlorine or bromine.

3. A bicycloheptene - 7 - syn-carbaldehyde of claim 1 wherein R³ is carbamoyl, methoxycarbonyl or N-methylcarbamoyl.

4. A bicycloheptene-7-syn-carbaldehyde selected from 5-chloro-7-syn-formaylbicyclo[2,2,1]hept-2-ene - 5 - carboxamide and methyl 5-chloro-7-syn-formylbicyclo[2,2,1]hept-2-ene-5-carboxylate.

5. A bicycloheptene - 7 - syn-carbaldehyde according to claim 1, said carbaldehyde being 5-chloro-7-syn-formylbicyclo[2,2,1]hept-2-ene-5-carboxamide.

References Cited
UNITED STATES PATENTS
2,758,918    8/1956    Soloway et al. _____ 260—557

HARRY I. MOATZ, Primary Examiner

U.S. Cl. X.R.

260—338, 343, 343.2 R, 464, 486 B, 468 D, 488 B, 544 L, 586 R, 590, 611 R